United States Patent [19]
Boon et al.

[11] Patent Number: 5,744,025
[45] Date of Patent: Apr. 28, 1998

[54] PROCESS FOR HYDROTREATING METAL-CONTAMINATED HYDROCARBONACEOUS FEEDSTOCK

[75] Inventors: Andries Qirin Maria Boon, The Hague; Constantinus Johannes Jacobus Den Ouden, Amsterdam, both of Netherlands; Opinder Kishen Bhan, Katy, Tex.

[73] Assignee: Shell Oil Company, Houston, Tex.

[21] Appl. No.: 808,597

[22] Filed: Feb. 28, 1997

[51] Int. Cl.$^6$ ..................................... C10G 45/06
[52] U.S. Cl. ............... 208/253; 208/251 H; 208/251 R; 208/216 R; 208/216 PP; 208/217; 208/264; 208/295; 208/145
[58] Field of Search ..................... 208/253, 251 R, 208/251 H, 210, 213, 216 PP, 216 R, 217, 145, 264, 295, 52 CT, 89

[56] References Cited

U.S. PATENT DOCUMENTS

| | | | |
|---|---|---|---|
| 3,936,370 | 2/1976 | Henke et al. | 208/210 |
| 4,306,964 | 12/1981 | Angevine | 208/210 |
| 5,266,300 | 11/1993 | Harrison | 423/628 |
| 5,468,371 | 11/1995 | Nelson et al. | 208/216 PP |

OTHER PUBLICATIONS

S. Brunauer, P. Emmett and B. Teller, *J. Am. Chm. Soc.*, 60, 309 (1938).
"*Oil and Gas Journal Special*", Oct. 2, 1995, pp. 38–44.

*Primary Examiner*—Bekir L. Yildirim

[57] ABSTRACT

The present invention provides a process for hydrotreating a metal-contaminated hydrocarbonaceous feedstock of which at least 60% wt. boils at a temperature 370° C., the process comprising contacting the feedstock at elevated temperature and elevated pressure in the presence of hydrogen with one or more catalyst beds each of a first catalyst, a second catalyst and a third catalyst, wherein (i) the first catalyst comprises a Group VI and/or a Group VIII hydrogenation metal component on an inorganic oxide support having at least 40% of its pore volume in pores with diameters in the range from 17 nm to 25 nm and a surface area in the range from 100 m$^2$/g to 160 m$^2$/g;

(ii) the second catalyst comprises a Group VI and/or a Group VIII hydrogenation metal component on an inorganic oxide support having at least 40% of its pore volume in pores with diameters in the range from 3 nm to 17 nm and a surface area in the range from 160 m$^2$/g to 350 m$^2$/g; and (iii) the third catalyst comprises a Group VI and a Group VIII hydrogenation metal component on an inorganic oxide support having at least 40% of its pore volume in pores with diameters in the range from 17 nm to 25 nm and a surface area in the range from 100 m$^2$/g to 160 m$^2$/g; the third catalyst being at least 1.5 times more active for demetallization than the first catalyst at contaminant metal deposition levels less than 5% wt.

13 Claims, No Drawings

PROCESS FOR HYDROTREATING METAL-CONTAMINATED HYDROCARBONACEOUS FEEDSTOCK

FIELD OF THE INVENTION

The present invention relates to a process for hydrotreating metal-contaminated hydrocarbonaceous feedstocks.

BACKGROUND OF THE INVENTION

Hydrocarbonaceous feedstocks such as residual oils produced by atmospheric or vacuum distillation of crude petroleum are characterized by relatively high sulfur, Conradson Carbon Residue (CCR) (a measure of coke forming tendency) and, especially, metals content. Principal metal contaminants are vanadium and nickel, with iron and copper sometimes also present. The high metals content of residual oils generally precludes their effective use as feedstocks in refinery processes such as catalytic cracking and hydrocracking as the metal contaminants deposit on the special catalysts used in these cracking processes causing premature catalyst aging and/or the formation of undesirable quantities of coke and gaseous products. Thus, the metal contaminants act as poisons of the above-mentioned catalysts, necessitating replacement of the catalysts after a shorter period of time than would otherwise be required.

Many processes are described in the art for reducing the metals content of residual oils. For example, U.S. Pat. No. 3,936,370 discloses a process for demetallizing a residual oil in a plurality of stages, each stage including a catalyst comprising Group VI and Group VIII hydrogenation metal components on an alumina support, the first stage catalyst containing a lower amount of hydrogenation metal components than the final stage catalyst, and the hydrogen pressure being higher in the first stage than the final stage.

Furthermore, U.S. Pat. No. 4,306,964 discloses a process for demetallizing a residual oil by contacting the oil sequentially with three or more catalysts having sequentially decreasing average pore diameters and sequentially increasing surface areas, the first catalyst having at least 60% of its pore volume in pores with diameters in the range from 100 to 200 Å (10 to 20 nm), up to 5% of its pore volume in pores greater than 500 Å (50 nm) and a surface area of up to 120 m²/g, the second catalyst having at least 40% if its pore volume in pores with diameters in the range from 50 to 100 Å (5 to 10 nm) and a surface area of 120 to 180 m²/g, and the last catalyst having at least 60% if its pore volume in pores with diameters in the range from 30 to 80 Å (3 to 8 nm) and a surface area of at least 200 m²/g.

SUMMARY OF THE INVENTION

The present invention is based on the discovery that metal-contaminated hydrocarbonaceous feedstocks can be very efficiently hydrotreated, in particular hydrodemetallized, when contacted with catalyst beds of selected wide pore and narrow pore catalysts arranged in a particular order.

Therefore, in accordance with the present invention, there is provided a process for hydrotreating a metal-contaminated hydrocarbonaceous feedstock of which at least 60% wt. (percent by weight) boils at a temperature equal to or above 370° C., the process comprising contacting the feedstock at elevated temperature and elevated pressure in the presence of hydrogen with one or more catalyst beds each of a first catalyst, a second catalyst and a third catalyst, wherein (i) the first catalyst comprises a Group VI and/or a Group VIII hydrogenation metal component on an inorganic oxide support having at least 40% of its pore volume in pores with diameters in the range from 17 to 25 nm and a surface area in the range from 100 to 160 m²/g;

(ii) the second catalyst comprises a Group VI and/or a Group VIII hydrogenation metal component on an inorganic oxide support having at least 40% of its pore volume in pores with diameters in the range from 3 to 17 nm and a surface area in the range from 160 to 350 m2/g; and (iii) the third catalyst comprises a Group VI and a Group VIII hydrogenation metal component on an inorganic oxide support having at least 40% of its pore volume in pores with diameters in the range from 17 to 25 nm and a surface area in the range from 100 to 160 m²/g; the third catalyst being at least 1.5 times more active for demetallization than the first catalyst at contaminant metal deposition levels less than 5% wt.

The feedstock used in the process of the present invention is one in which at least about 60% wt., preferably at least about 70% wt., and especially at least about 80% wt., boils at a temperature equal to or above 370° C. Examples of feedstocks that may be used in the invention include vacuum gas oils, (deasphalted) atmospheric residual oils, (deasphalted) vacuum residual oils and shale oils. These feedstocks contain metal contaminants such as vanadium and/or nickel and/or iron which may be present in a total amount of up to 600 ppmw (parts per million by weight), e.g. in the range from 10 to 600 ppmw, from 10 to 500 ppmw, from 10 to 400 ppmw, from 10 to 300 ppmw or, alternatively, from 20 to 200 ppmw, calculated as metal(s), based on total feedstock. Ordinarily, the feedstock will contain ≦200 ppmw vanadium and nickel contaminants, calculated as the metals (Ni plus V) based on total feedstock. A preferred feedstock to use is one containing ≦100 ppmw vanadium contaminants.

The feedstock will usually also contain sulfur and nitrogen contaminants. The sulfur contaminants may be present in an amount of from about 0.2% wt. to about 8% wt., typically from about 1% wt. to about 6% wt., calculated as sulfur based on total feedstock, and the nitrogen contaminants may be present in an amount up to 5000 ppmw, typically in the range from 250 to 2000 ppmw, calculated as nitrogen based on total feedstock. Moreover, the feedstock will generally have a CCR value of up to about 25%, typically in the range from about 12% to 15%.

The process of the present invention may conveniently be carried out at a temperature in the range from about 300° C. to about 500° C., preferably from about 300° C. to about 450° C., and more preferably from about 325° C. to about 425° C.

Furthermore, the total pressure (at the reactor inlet) is preferably in the range from $2\times10^6$ to $2.5\times10^7$ Pa (20 to 250 bar), more preferably from $2\times10^6$ to $2\times10^7$ Pa (20 to 200 bar) and, in particular, from $3\times10^6$ to $1.8\times10^7$ Pa (30 to 180 bar).

The hydrogen partial pressure (at the reactor inlet) is preferably in the range from $2\times10^6$ to $2.4\times10^7$ Pa (20 to 240 bar), more preferably from $2\times10^6$ to $1.9\times10^7$ Pa (20 to 190 bar) and, in particular, from $3\times10^6$ to $1.7\times10^7$ Pa (30 to 170 bar).

A weight hourly space velocity (WHSV) in the range from 0.1 to 10 kg feedstock per liter catalyst per hour (kg/l/hr) is conveniently used. Preferably the space velocity is in the range from 0.1 to 8, especially from 0.1 to 5 kg/l/hr.

In the process of the present invention, the feedstock to be hydrotreated is contacted, in the following order, with a first catalyst, a second catalyst and a third catalyst. Each catalyst may be contained in one or more catalyst beds and the catalyst beds may be located in one or more reactors. In a preferred aspect of the invention, the feedstock is passed in a downward direction through one or more vertically arranged reactors containing fixed or moving catalyst beds.

The first catalyst comprises a Group VI and/or a Group VIII hydrogenation metal component on an inorganic oxide support having at least about 40%, preferably at least about 60%, of its pore volume in pores with diameters in the range from about 17 nm to about 25 nm and a surface area in the range from about 100 m$^2$/g to about 160 m$^2$/g, advantageously from about 115 m$^2$/g to about 150 m$^2$/g, as determined by the well-known Brunauer-Emmett-Teller (BET) method (S. Brunauer, P. Emmett and B. Teller, J. Am. Chm. Soc., 60, 309 (1938)), using nitrogen as the adsorbate. The activity of the first catalyst should be primarily that of demetallization. The second catalyst comprises a Group VI and/or a Group VIII hydrogenation metal component on an inorganic oxide support having at least about 40%, preferably at least about 60%, of its pore volume in pores with diameters in the range from about 3 nm to about 17 nm and a BET surface area in the range from about 160 m$^2$/g to about 350 m$^2$/g, advantageously from about 170 m$^2$/g to about 280 m$^2$/g. The second catalyst may have demetallization and/or desulfurization and/or denitrogenation and/or CCR removal activity.

Preferably, the second catalyst comprises an inorganic oxide support which has either at least about 40% of its pore volume in pores with diameters in the range from about 10 nm to about 17 nm and a BET surface area in the range from about 160 m$^2$/g to about 220 m$^2$/g, or alternatively, at least about 40% of its pores volume in pores with diameters in the range from about 3 nm to about 10 nm and a BET surface area in the range from about 220 m$^2$/g to more 350 m$^2$/g.

In a further preferred aspect of the invention, use is made of a plurality of beds of second catalyst, the feedstock contacting one or more beds of second catalyst comprising an inorganic oxide support having at least about 40% of its pore volume in pores with diameters in the range from about 10 nm to about 17 nm and a surface area in the range from about 160 m$^2$/g to about 220 m$^2$/g, directly followed by one or more beds of second catalyst comprising an inorganic oxide support having at least about 40% of its pore volume in pores with diameters in the range from about 3 nm to about 10 nm and a surface area in the range from about 220 m$^2$/g to about 350 m$^2$/g.

The third catalyst comprises a Group VI and a Group VIII hydrogenation metal component on an inorganic oxide support having at least about 40%, preferably at least about 60%, of its pore volume in pores with diameters in the range from about 17 nm to about 25 nm and a BET surface area in the range from about 100 m$^2$/g to about 160 m$^2$/g, advantageously from about 110 m$^2$/g to about 140 m$^2$/g. The third catalyst should have primarily demetallization activity and should be at least 1.5, e.g. 2 or 2.5, times more active for demetallization than the first catalyst at contaminant metal (e.g. vanadium) deposition levels less than 5% wt. under the same conditions.

The catalysts preferably each individually comprise at least one Group VI/VIII hydrogenation metal component selected from the group consisting of molybdenum, tungsten, cobalt, nickel, their oxides and sulfides. If more than one hydrogenation metal component is used, nickel/tungsten, nickel/molybdenum and cobalt/molybdenum combinations are preferred.

The first catalyst preferably contains a Group VI hydrogenation metal component, especially a molybdenum component, while the second and third catalysts preferably each individually contain both a Group VI and a Group VIII hydrogenation metal component, especially a molybdenum component with a nickel component.

If any one of the first, second and third catalysts comprises a Group VI hydrogenation metal component, it is preferably present in overall amount of from about 2% wt. to about 20% wt., more preferably from about 2% wt. to about 10% wt., calculated as metal based on total catalyst.

Similarly, if any one of the first, second and third catalysts comprises a Group VIII hydrogenation metal component, it is preferably present in an overall amount of from about 1% wt. to about 15% wt., more preferably from about 1% wt. to about 10% wt., calculated as metal based on total catalyst.

The catalysts each individually comprise an inorganic oxide support which may, for example, be alumina, silica-alumina, silica, aluminum phosphate, magnesia, titania, zirconia, silica-zirconia, silica-boria, or a mixture of two or more thereof. Preferably, the catalysts each individually comprise an inorganic oxide support selected from alumina, silica-alumina and silica. Alumina is most preferred.

The catalysts may, if desired, further comprise a small amount of phosphorus, e.g., in the range from about 0.2% wt. to about 5% wt., typically from about 1% wt. to about 3% wt.

The first, second and third catalysts can be prepared by methods conventional in the art. Thus, the catalysts may each conveniently be prepared by impregnating an inorganic oxide support such as alumina with a solution of Group VI/VIII hydrogenation metal component(s), optionally containing phosphoric acid, followed by drying (e.g. at a temperature in the range from about 100° C. to about 150° C.) and calcining in air (e.g. at a temperature in the range from about 350° C. to about 500° C.).

The hydrotreated feedstock obtained as product from the present process, being virtually free of metal contaminants, may very suitably be further processed by catalytic cracking. Accordingly, the present invention further provides a process for converting a hydrocarbonaceous feedstock into lower boiling materials, which comprises contacting the feedstock at elevated temperature in the presence of a cracking catalyst, wherein the feedstock is derived from a hydrotreating process according to the invention.

The cracking process may be carried out in a fixed catalyst bed but is preferably carried out in an upwardly or downwardly moving catalyst bed, e.g. in the manner of conventional Fluidized Catalytic Cracking (FCC) processes. The process conditions are preferably a reaction temperature in the range from about 400° C. to about 900° C., more preferably from about 450° C. to about 800° C. and especially from about 500° C. to about 650° C.; a total pressure of from about $1 \times 10^5$ to about $1 \times 10^6$ Pa (1 to 10 bar), in particular from about $1 \times 10^5$ to about $7.5 \times 10^5$ Pa (1 to 7.5 bar); a catalyst/feedstock weight ratio (kg/kg) in the range from about 0.1 to about 150, especially about 20 to about 100 if a moving catalyst bed is used; and a contact time between catalyst and feedstock in the range from about 0.1 seconds to about 100 seconds, with contact times in the range from 0.1 seconds to about 10 seconds being preferred if a moving catalyst bed is used.

The cracking catalyst used may be any of those conventionally used in the art, e.g. as described in the "Oil and Gas Journal Special" dated 2 Oct. 1995, pp. 38 to 44.

The present invention will be further understood from the following Example which is illustrative and therefore not intended to be construed as limiting the scope of the present invention, in which surface areas were determined by the Brunauer-Emmett-Teller (BET) method, using nitrogen as the adsorbate. The amounts of hydrogenation metal/vanadium components are quoted as percentages by weight metal, based on the total weight of catalyst/feedstock.

EXAMPLE

An atmospheric residual oil (long residue) was hydrotreated over a series of Catalysts A (first catalyst), B (second catalyst), C (second catalyst) and D (third catalyst) in a hydroprocessing pilot plant.

Catalyst A, a commercially available demetallization catalyst, comprised 4% wt. molybdenum on an alumina support having an average pore diameter of 19.5 nm, a surface area of 140 m$^2$/g and a water pore volume of 0.97 ml/g.

Catalyst B, a commercially available demetallization/desulfurization catalyst, comprised 1.5% wt. nickel, 8.2% wt. molybdenum and 2% wt. phosphorus on an alumina support having an average pore diameter of 15 nm, a surface area of 180 m$^2$/g and a water pore volume of 0.88 ml/g.

Catalyst C, a commercially available demetallization/desulfurization catalyst, comprised 2% wt. nickel, 11.3% wt. molybdenum and 2% wt. phosphorus on an alumina support having an average pore diameter of 9 nm, a surface area of 250 m$^2$/g and a water pore volume of 0.75 ml/g.

Catalysts A, B and C are commercially available from the Criterion Catalyst Company, Houston, U.S.A.

Catalyst D comprised 2% wt. nickel, 7.7% wt. molybdenum and 1% wt. phosphorus on an alumina support having an average pore diameter of 19.5 nm, a surface area of 140 m$^2$/g and a water pore volume of 0.97 ml/g.

Catalyst D was 2.5 times more active for demetallization than Catalyst A at contaminant metal deposition levels less than 5% wt.

The feedstock having an initial vanadium content of 80 ppmw and a sulfur content of 4% wt. (based on feedstock) was processed over Catalyst A in conventional manner to reduce the vanadium content to in the region of 10 to 12 ppmw. The feedstock, after processing, was found to have the properties shown in Table I below.

TABLE I

| Carbon content | 85.6% wt. |
| --- | --- |
| Hydrogen content | 11.6% wt. |
| H/C atomic ratio | 1.6 |
| Vanadium content | 12 ppmw |
| Sulfur content | 2.1% wt. |
| Fraction boiling below 250° C. | 3.2% wt. |
| Fraction boiling 250–370° C. | 8.0% wt. |
| Fraction boiling 370–520° C. | 39.2% wt. |
| Fraction boiling above 520° C. | 49.6% wt. |

The feedstock was then passed over a series of catalyst beds containing Catalysts B, C and D in that order under the following process conditions: a weight hourly space velocity (WHSV) of 0.6 kg/l/hr, a hydrogen partial pressure of 1.6×10$^7$ Pa (160 bar) and a total pressure of 1.62×10$^7$ Pa (162 bar). The reaction temperature was controlled so as to achieve a reduction in the sulfur content to 0.6% wt. Catalysts B, C and D occupied respectively 33%, 50% and 17% of the total catalyst volume.

The hydrotreated feedstock obtained as final product comprised 2 ppmw vanadium (a reduction in vanadium content from 12 to 2 ppmw of 83%) and 0.6% wt. sulfur.

For the purposes of comparison, a feedstock having the properties of Table I was passed over a series of catalyst beds containing Catalysts B and C in that order under the following process conditions: a weight hourly space velocity (WHSV) of 0.6 kg/l/hr, a hydrogen partial pressure of 1.6×10$^7$ Pa (160 bar) and a total pressure of 1.62×10$^7$ Pa (162 bar). The reaction temperature was controlled so as to achieve a reduction in the sulfur content to 0.6% wt. Catalysts B and C occupied respectively 33% and 67% of the same total catalyst volume as above.

The hydrotreated feedstock obtained as final product comprised 4.5 ppmw vanadium (a reduction in vanadium content from 12 to 4.5 ppmw of 62%) and 0.6% wt. sulfur.

What is claimed is:

1. A process for hydrotreating a metal-contaminated hydrocarbonaceous feedstock of which at least about 60% wt. boils at a temperature≧370° C., which comprises contacting the feedstock at elevated temperature and elevated pressure in the presence of hydrogen with one or more catalyst beds each of a first catalyst, a second catalyst and a third catalyst where first, second and third designate the order of the catalyst contact with said feed, wherein (i) the first catalyst comprises a Group VI and/or a Group VIII hydrogenation metal component on an inorganic oxide support having at least about 40% of its pore volume in pores with diameters in the range from about 17 nm to about 25 nm and a surface area in the range from about 100 m$^2$/g to about 160 m$^2$/g;

(ii) the second catalyst comprises a Group VI and/or a Group VIII hydrogenation metal component on an inorganic oxide support having at least about 40% of its pore volume in pores with diameters in the range from about 3 nm to about 17 nm and a surface area in the range from 160 m$^2$/g to 350 m$^2$/g; and (iii) the third catalyst comprises a Group VI and a Group VIII hydrogenation metal component on an inorganic oxide support having at least about 40% of its pore volume in pores with diameters in the range from about 17 nm to about 25 nm and a surface area in the range from about 100 m$^2$/g to about 160 m$^2$/g;

wherein the third catalyst is at least 1.5 times more active for demetallization than the first catalyst at contaminant metal deposition levels of less than 5% wt.

2. The process according to claim 1 wherein said process is carried out at a temperature in the range from about 300° C. to about 500° C.

3. The process according to claim 1, wherein said process is carried out at a total pressure in the range from about 2×10$^6$ Pa to about 2.5×10$^7$ Pa.

4. The process according to claim 1, wherein each of said catalysts individually comprise at least one hydrogenation metal component selected from the group consisting of molybdenum, tungsten, cobalt, nickel, and oxides, sulfides and mixtures thereof.

5. The process according to claim 1, wherein, for each of said catalysts, the Group VI hydrogenation metal component is used in an overall amount of from about 2% wt. to 20% wt., calculated as metal based on total catalyst.

6. The process according to claim 1, wherein, for each of said catalysts, the Group VIII hydrogenation metal component is used in an overall amount of from about 1% wt. to about 15% wt., calculated as metal based on total catalyst.

7. The process according to claim 1, wherein each of said catalysts individually comprises an inorganic oxide support selected from the group consisting of alumina, silica-alumina and silica.

8. The process according to claim 1, wherein the feedstock is selected from the group consisting of a vacuum gas oil, an atmospheric residual oil, a vacuum residual oil and mixtures thereof.

9. The process according to claim 1, wherein the feedstock contains contaminant amounts of vanadium.

10. The process according to claim 1 wherein said process is carried out using a plurality of beds of second catalyst, wherein the feedstock is contacted with one or more beds of second catalyst comprising an inorganic oxide support having at least about 40% of its pore volume in pores with diameters in the range from about 10 nm to 17 nm and a surface area in the range from about 160 m$^2$/g to about 220 m$^2$/g, directly followed by one or more beds of second catalyst comprising an inorganic oxide support having at least about 40% of its pore volume in pores with diameters in the range from about 3 nm to about 10 nm and a surface area in the range from about 220 m$^2$/g to about 350 m$^2$/g.

11. A process for converting a hydrocarbonaceous feedstock into lower boiling materials, which comprises contacting a metal-contaminated hydrocarbonaceous feedstock of which at least about 60% wt. boils at a temperature $\geq$370° C., at elevated temperature and elevated pressure in the presence of hydrogen with one or more catalyst beds each of a first catalyst, a second catalyst and a third-catalyst, where first, second and third designate the order of the catalyst contact with said feed, wherein (i) the first catalyst comprises a Group VI and/or a Group VIII hydrogenation metal component on an inorganic oxide support having at least about 40% of its pore volume in pores with diameters in the range from about 17 nm to about 25 nm and a surface area in the range from about 100 m$^2$/g to about 160 m$^2$/g;

(ii) the second catalyst comprises a Group VI and/or a Group VIII hydrogenation metal component on an inorganic oxide support having at least about 40% of its pore volume in pores with diameters in the range from about 3 nm to about 17 nm and a surface area in the range from 160 m$^2$/g to 350 m$^2$/g; and (iii) the third catalyst comprises a Group VI and a Group VIII hydrogenation metal component on an inorganic oxide support having at least about 40% of its pore volume in pores with diameters in the range from about 17 nm to about 25 nm and a surface area in the range from about 100 m$^2$/g to about 160 m$^2$/g;

wherein the third catalyst is at least 1.5 times more active for demetallization than the first catalyst at contaminant metal deposition levels of less than 5% wt.

12. The process according to claim 11 wherein said process is carried out at a temperature in the range from about 300° C. to about 500° C.

13. The process according to claim 11, wherein said process is carried out at a total pressure in the range from about 2×10$^6$ Pa to about 2.5×10$^7$ Pa.

* * * * *